(12) United States Patent
French

(10) Patent No.: US 12,388,623 B2
(45) Date of Patent: Aug. 12, 2025

(54) METHOD FOR PROCESSING ENCRYPTED DATA

(71) Applicant: Barclays Execution Services Limited, London (GB)

(72) Inventor: George French, London (GB)

(73) Assignee: Barclays Execution Services Limited, London (GB)

( * ) Notice: Subject to any disclaimer, the term of this patent is extended or adjusted under 35 U.S.C. 154(b) by 182 days.

(21) Appl. No.: 18/035,265

(22) PCT Filed: Dec. 18, 2020

(86) PCT No.: PCT/EP2020/087139
§ 371 (c)(1),
(2) Date: May 3, 2023

(87) PCT Pub. No.: WO2022/096141
PCT Pub. Date: May 12, 2022

(65) Prior Publication Data
US 2023/0403134 A1    Dec. 14, 2023

(30) Foreign Application Priority Data
Nov. 6, 2020   (EP) .................................... 20206297

(51) Int. Cl.
*H04L 29/06* (2006.01)
*H04L 9/06* (2006.01)
(Continued)

(52) U.S. Cl.
CPC .......... *H04L 9/0637* (2013.01); *H04L 9/0819* (2013.01); *H04L 9/14* (2013.01)

(58) Field of Classification Search
None
See application file for complete search history.

(56) References Cited

U.S. PATENT DOCUMENTS

2017/0272243 A1    9/2017   Araki
2018/0026785 A1    1/2018   Mori et al.

FOREIGN PATENT DOCUMENTS

| DE | 102008042406 A1 | 4/2010 | |
|---|---|---|---|
| EP | 2728790 A1 * | 5/2017 | ........... H04L 63/062 |
| WO | WO-2022/096141 A1 | 5/2022 | |

OTHER PUBLICATIONS

David A Mcgrew et al: "The Galois/Counter Mode of Operation (GCM)", Progress in cryptology—Indocrypt 2004 : 5th International Conference on Cryptology in India, Chennai, India, Dec. 20-22, 2004; proceedings, May 31, 2005 (May 31, 2005), XP55285316, DE ISBN: 978-3-540-24130-0 (Year: 2005).*

(Continued)

*Primary Examiner* — Andrew J Steinle
(74) *Attorney, Agent, or Firm* — Wilmer Cutler Pickering Hale and Dorr LLP

(57) ABSTRACT

This disclosure relates to a computer-implemented method, a data processing apparatus, a computer program, and a computer-readable storage medium for processing encrypted data. There is provided a computer-implemented method for processing a first ciphertext, $C_1$, wherein the first ciphertext is data encrypted with a plurality of keys, $k_1 \ldots k_n$, the method comprising: receiving a first key, $k_1$, wherein the first key is one of the plurality of keys; receiving the first ciphertext, $C_1$; and performing an exclusive OR operation on the first ciphertext, $C_1$, and the first key, $k_1$, to produce a second ciphertext, $C_2$, such that the second ciphertext, $C_2$, is the data encrypted with the plurality of keys $k_2 \ldots k_n$, and not with the first key, $k_1$.

21 Claims, 10 Drawing Sheets

(51) Int. Cl.
  *H04L 9/08* (2006.01)
  *H04L 9/14* (2006.01)

(56) References Cited

OTHER PUBLICATIONS

Menezes et al.; "Chapter 7: Block Ciphers", Handbook of Applied Cryptography; [CRC Press Series On Discrete Mathematices and Its Applications], CRC Press, Boca Raton, FL, US, pp. 223-282, Oct. 1, 1996 (Oct. 1, 1996), XP001525007, ISBN: 978-0-8493-8523-0 (Year: 1996).*
International Search Report and Written Opinion mailed Jul. 28, 2021, in the International Application PCT/EP2020/087139. 11 pages.
McGrew et al., "The Galois/Counter Mode of Operation (GCM)," Progress in cryptology—Indocrypt 2004: 5th International Conference on Cryptology in India; Dec. 20-22, 2004, Chennai, India, proceedings May 31, 2005. 43 pages. (https://csrc.nist.rip/groups/ST/toolkit/BCM/documents/proposedmodes/gcm/gcm-spec.pdf).
Menezes et al., "Block Ciphers," Chapter 7, Handbook of Applied Cryptography, CRC Press, Boca Raton, Florida, Oct. 1, 1996. 61 pages. (https://cacr.uwaterloo.ca/hac/about/chap7.pdf).
Menezes et al., "Key Management Techniques," Chapter 13, Handbook of Applied Cryptography, CRC Press, Boca Raton, Florida, Oct. 1, 1996. 49 pages. (https://cacr.uwaterloo.ca/hac/about/chap7.pdf).

* cited by examiner

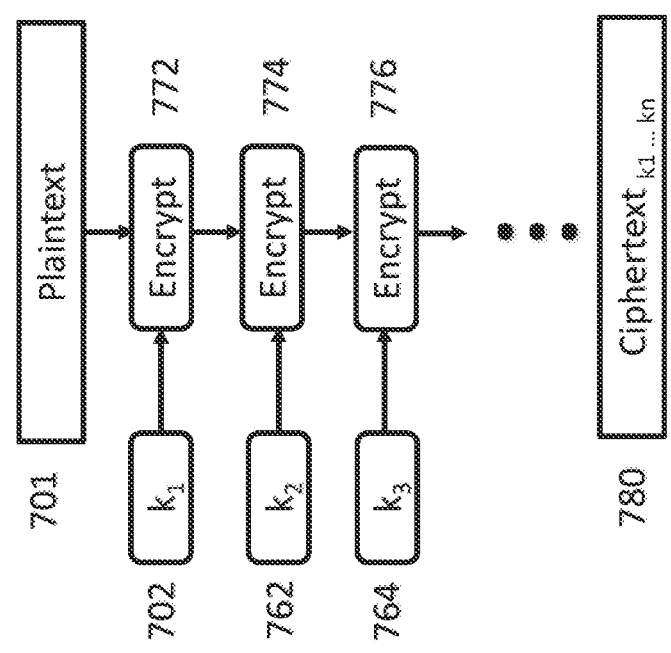

METHOD FOR PROCESSING ENCRYPTED DATA

CROSS-REFERENCE TO RELATED APPLICATIONS

This application is a 371 National Phase Application of PCT/EP2020/087139 filed Dec. 18, 2020 which claims priority to EP Patent Application No. 20206297.2, filed on Nov. 6, 2020, the disclosure of which is hereby incorporated herein by reference in its entirety.

TECHNICAL FIELD

The invention described herein pertains to a computer-implemented method, a data processing apparatus, a computer program, and a computer-readable storage medium for processing encrypted data. For example, the disclosure below provides for the processing of encryption keys and encrypted data in a secure manner.

BACKGROUND

In the field of cryptography, data can be encrypted using a key such that the data is not readable or intelligible by a third party who does not possess a key. The data in its original state, i.e. before encryption with a key, is typically referred to as plaintext and the data in its encrypted state, i.e. after encryption with a key, is typically referred to as ciphertext.

Storing data as ciphertext, rather than as plaintext, is advantageous for data security because an attacker, in the event of a security breach, can retrieve only the ciphertext; this is unintelligible to the attacker and any other party who does not possess the key.

Once ciphertext has been encrypted, in the case of symmetric encryption, it can only be decrypted by a trusted party which has access to the same key with which it was encrypted, or, in the case of asymmetric encryption, by a party which has a private key (associated with the original encryption key). Many of the recent developments in cryptographic methods have focussed on asymmetric encryption. Asymmetric encryption has become increasingly popular, particularly in the field of secure communication, because it does not suffer from the "key exchange problem". In other words, the sharing of a single private key between two communicating parties is not required.

Currently, in order to change the way in which data is encrypted, for example to encrypt the data with a new key, the ciphertext is first decrypted using the original key and then the resulting plaintext can be encrypted using the new key.

With known methods, changing the way in which data is encrypted requires that the data appears in clear, or as plaintext, at least once during the "change" process. If the plaintext is available to view during this process, then the encryption process is rendered obsolete because the data is no longer secure for a period of time, and malicious parties can exploit this vulnerability to obtain the plaintext.

Currently, this problem can be mitigated by changing the encryption within secured hardware, for example in a hardware security module (HSM). This means that, although the plaintext does appear during the process, it is not available to an attacker because the HSM is typically installed in a secure location and the keys and data contained within the HSM are only accessible to trusted parties. Secure hardware, such as an HSM, is expensive to install and maintain, and faces compatibility issues with cloud based servers.

FIG. 1 illustrates a prior art system for processing encrypted data which may be used to modify ciphertext, such that it becomes encrypted under a new key. In a first step 10, ciphertext encrypted under Key X is transmitted to an HSM from a database at a first system. In a second step 11, the Key X, which was used to encrypt the ciphertext originally, is used to decrypt the ciphertext, producing plaintext. In a third step 12, the plaintext is encrypted using Key Y to produce ciphertext encrypted under Key Y. In a fourth and final step 13, the ciphertext encrypted under Key Y is transmitted back to the database at the first system. The system of FIG. 1 is reliant on the HSM for data security because, when the plaintext appears in clear, it must not be accessible to third parties. In order to modify encrypted data, one must either possess or have access to an HSM which, as previously established, has drawbacks related to both expense and cloud compatibility.

There are also a limited number of known methods for performing computation on ciphertext, such as homomorphic encryption, but none is able to modify the way in which the ciphertext is encrypted. Furthermore, performing computation on ciphertext using known methods, such as homomorphic encryption, is highly computationally demanding and expensive, and therefore requires significant time and processing resources.

SUMMARY

In one aspect of the invention, there is provided a computer-implemented method for processing a first ciphertext, $C_1$, wherein the first ciphertext is data encrypted with a plurality of keys, $k_1 \ldots k_n$, the method comprising: receiving a first key, $k_1$, wherein the first key is one of the plurality of keys; receiving the first ciphertext, $C_1$; and performing an exclusive OR operation on the first ciphertext, $C_1$, and the first key, $k_1$, to produce a second ciphertext, $C_2$, such that the second ciphertext, $C_2$, is the data encrypted with the plurality of keys $k_2 \ldots k_n$, and not with the first key, $k_1$.

In this way, the method allows encrypted data to be processed, and for the encryption key under which the plaintext is encrypted to be changed, without incurring significant computational and time costs and without the plaintext appearing in clear. This is achieved by innovative use of the properties of the exclusive OR logic function (XOR).

The first ciphertext is data which has previously been encrypted with the plurality of keys. It will be understood that encryption of the data with the plurality of keys to produce the first ciphertext can form part of the disclosed method; however this need not be a requirement of the invention per se. It will be appreciated that encryption of the data with the plurality of keys to produce the first ciphertext may not form part of the method itself, rather the first ciphertext has been encrypted with the plurality of keys before it is received.

Whilst performing an XOR function on encryption keys is generally known in the art, it has only been used typically to generate further encryption keys with which to encrypt plaintext or to enable key sharing. DE102008042406A1, for example, describes that the benefit of using an XOR function on two encryption keys is the generation of a third encryption key with minimal computing power. The third encryption key is then used to encrypt plaintext, so the resulting ciphertext is simply encrypted with the third encryption key. This is merely a method for generating keys and does not allow ciphertext to be modified, nor the key under which the data is encrypted to be changed, and accordingly has never provided a solution to the problem addressed by the present invention.

In the context of key sharing, it has also been known to apply an XOR operation to parts, or halves, of encryption keys. By splitting a key into two or more parts, the key can be stored securely in multiple locations and only generated in its complete form when required. The complete encryption key is then used as a standard encryption key, i.e. to encrypt plaintext. The parts of the key are not themselves used to encrypt plaintext. Some publications, for example US2017/272243A1, refer to the key halves as 'keys'; however these 'keys' are never used alone to encrypt plaintext or decrypt ciphertext and should also therefore be considered to be key halves. Whilst this is a known method for sharing a key, it cannot modify ciphertext, and thus additionally has never provided a solution to the problem addressed by the present invention.

The aforementioned known methods involving an XOR function are unable to modify ciphertext in order to change the properties of the encryption. In particular, irrespective of how many keys are contemplated and how the keys are generated, no known method has ever employed encryption keys in combination with ciphertext for anything other than eventual decryption to plaintext. In other words, once ciphertext has been generated by known encryption methods, the next and only further step typically performed on the ciphertext itself (in relation to the encryption) is one of decryption of the ciphertext to plaintext using the same key that encrypted it.

The present invention utilises an XOR function applied to a ciphertext generated with a plurality of keys and to one of the plurality of keys in order to "re-encrypt" the ciphertext with a new plurality of keys which does not include the "removed" key. This, in effect, produces a new encryption key under which the data is encrypted. This is advantageous because it allows, for example, renewal of the crypto period, or operational life, of an encryption key, which may be required in order to comply with security standards. This is achieved without the data, or plaintext, ever appearing in the clear. If the original plurality of keys is kept secure, the data, or plaintext, cannot be retrieved by a third party, even if the third party is able to access the ciphertext and/or some but not all of the individual keys of the plurality of keys.

The method may further comprise receiving a further key, $k_i$, $i=\{2 \ldots n\}$; receiving ciphertext $C_i$; and performing an exclusive OR operation on the ciphertext $C_i$ and the further key, $k_i$, to produce ciphertext $C_{i+1}$, such that the ciphertext $C_{i+1}$ is the data encrypted with the plurality of keys $k_{i+1} \ldots k_n$, and not with the keys $k_1 \ldots k_i$. In this way, a further key can be "removed" from the original encryption with the plurality of keys, which, as detailed above, provides data encrypted effectively encrypted with a new key.

The method may further comprise iteratively repeating the steps relating to ciphertext $C_i$ once for each remaining key of the plurality of keys $k_{i+1} \ldots k_n$, wherein, after each iteration, the ciphertext is encrypted with one fewer key, and wherein, after all of the iterations, the data is no longer encrypted with any of the plurality of keys. In this way, further keys can be "removed" from the original encryption, each removal renewing the crypto period of the encryption. Finally, the plaintext can be retrieved by "removing" the final key, in what amounts to a decryption step. Of course, in order to retain the security of the data, or plaintext, the final step should be performed in a secure environment such that neither the plaintext, nor the value of the remaining key, are available to third parties.

The performance of each iteration of this method may be separated by a predetermined time period. A predetermined time period may be determined during the initial encryption of the data with the plurality of keys, which may or may not itself form part of the claimed method, or may be determined between iterations. The predetermined time period may correspond to, or may be shorter than, the crypto period of the encryption key, such that the crypto period is never exceeded. The crypto period herein may refer to the crypto period of a plurality of keys once combined to form a single key. The individual keys of the plurality of keys will have their own crypto periods, as will the key into which they are combined; the crypto period of the individual keys may be the same, or may be different, to the crypto period of the combined plurality of keys.

The method may further comprise receiving the data as plaintext; receiving the plurality of keys $k_1 \ldots k_n$; and encrypting the plaintext with the plurality of keys $k_1 \ldots k_n$ to produce the first ciphertext, $C_1$. In this way, the method also includes the original encryption step of the plaintext with the plurality of keys. This step may be performed in a secure environment, in order to limit third party access to the plaintext and/or plurality of keys. Encrypting the plaintext may comprise: (a) combining the plurality of keys, $k_1 \ldots k_n$, with exclusive OR operations to produce a combined key, $k_c$; and performing an encryption operation on the plaintext with the combined key $k_c$. Combining the plurality of keys may comprise: performing an exclusive OR operation on two distinct keys, $k_i$ and $k_{i+1}$, of the plurality of keys $k_1 \ldots k_n$, to produce a partially combined key, $k_p$; (b) updating the partially combined key, $k_p$, by performing an exclusive OR operation on the partially combined key, $k_p$, and a key, $k_{i+2}$, of the plurality of keys $k_1 \ldots k_n$; and (c) repeating step (b) for each successive key of the plurality of keys $k_1 \ldots k_n$ to produce the combined key $k_c$.

In this way, the method produces a combined key $k_c$ in a set of initial steps, before then encrypting the plaintext with this combined key in a single encryption step. This method may be computationally efficient, thus being faster and requiring less in terms of processing resources, for certain types, or lengths, of encryption key.

Encrypting the plaintext may alternatively comprise: (a) encrypting the plaintext with a key, $k_i$, of the plurality of keys $k_1 \ldots k_n$; and (b) successively encrypting the output of step (a) with each remaining key, $k_{i+1} \ldots k_n$ of the plurality of keys, thereby producing the first ciphertext, $C_1$.

In this way, the method iteratively encrypts the plaintext with each key of the plurality of keys, rather than first combining the keys and then performing a single encryption step. This method may be computationally efficient, thus being faster and requiring less in terms of processing resources, for certain types, or lengths, of encryption key.

Processing the encrypted data may be achieved using a block cipher. A block cipher is advantageous because it ensures that identical input blocks do not form identical encrypted blocks, which could compromise the security of the algorithm. This is achieved by changing the encryption for each block, for example by implementing a counter or by incorporating the previous block into the encryption of the next block. In this way, a block cipher may be considered to act as a stream cipher.

Block ciphers which are capable of acting as stream ciphers include any cryptographic mode of operation which allows a cryptographic block cipher to act as a binary additive stream cipher. Such cryptographic modes of operation include, but are not limited to: counter mode, Galois/counter mode, output feedback mode, and cipher feedback mode.

Processing the encrypted data in a counter mode of operation may comprise: for a first block of the first ciphertext, concatenating a first initialisation vector and a first counter value to produce a first concatenated vector; producing first encryption data by encrypting the first concatenated vector with the first key, $k_1$; and performing the exclusive OR operation on the first encryption data and first ciphertext.

Processing the encrypted data in a counter mode of operation, wherein the first ciphertext comprises x blocks, for each of the second to xth blocks of the first ciphertext may additionally comprise: incrementing the counter value; and repeating the counter mode operation performed on the previous block using the incremented counter value.

In this way, the method can process blocks of ciphertext in parallel with one another, thereby advantageously reducing the time required to perform the method. This is possible because the processing performed on each block of ciphertext is not dependent on the result of processing performed on any other block of ciphertext. While a certain block of ciphertext is being processed, the counter can be incremented and processing can begin on the next block.

Processing the encrypted data in a Galois/counter mode operation may comprise: receiving a first authentication tag associated with the first ciphertext; receiving a second authentication tag associated with the second ciphertext; computing a third authentication tag using a Galois message authentication code function with the first ciphertext as the key; computing a fourth authentication tag using a Galois message authentication code function with the second ciphertext as the key; comparing the first and third authentication tags; and comparing the second and fourth authentication tags.

In this way, the method can authenticate the first ciphertext to ensure that the first ciphertext has not been changed since its original encryption, and generate an authentication tag with which the second ciphertext can be authenticated in the future. The method provides authenticated encryption and enables future authenticated encryption. A Galois/counter mode of operation may also be able to benefit from increased efficiency and performance because the function and authentication can be operated in parallel, thereby advantageously reducing the time taken to perform the method.

Computing the third authentication tag may additionally comprise: (i) performing Galois field multiplication on first authentication data to produce a first authentication stream; (ii) performing an exclusive OR operation on the first authentication stream and the first block of the first ciphertext; (iii) performing Galois field multiplication on the product of step ii; (iv) repeating steps ii and iii for every block of the first ciphertext; (v) performing Galois field multiplication on the product of step iv; (vi) performing an exclusive OR operation on the product of step v and a first length authentication vector, wherein the length authentication vector is a length of the first authentication data concatenated with a length of the first ciphertext; (vii) performing Galois field multiplication on the product of step vi; and (viii) performing an exclusive OR operation on the product of step vii and the first encryption data.

Computing the fourth authentication tag may additionally comprise: performing the method used to produce the third authentication tag on second authentication data, the second ciphertext, a second length authentication vector, and the second encryption data, wherein the second length authentication vector is a length of the second authentication data concatenated with a length of the second ciphertext.

Processing the encrypted data in a cipher feedback mode may comprise: encrypting a first initialisation vector with the first key, $k_1$, to produce first encryption data; performing the exclusive OR operation on the first encryption data and the first ciphertext.

The first ciphertext may comprise x blocks and the second ciphertext may comprise x blocks, and for the xth block of the first ciphertext, processing the encrypted data in a cipher feedback mode may additionally comprise: (i) encrypting the $(x-1)^{th}$ block of the second ciphertext with the first key, $k_1$, wherein performing an exclusive OR operation on the first ciphertext and the first key comprises performing an exclusive OR operation on the product of step i and the xth block of the first ciphertext to produce an xth block of the second ciphertext.

In this way, the method provides a self-synchronising stream cipher. A self-synchronising stream cipher can be advantageous because a party receiving the output of the cipher automatically synchronises with the keystream generator, providing confidentiality and limiting error propagation. Automatic synchronisation means that the cipher recovers effectively if bits are added to, or dropped from, the input to the cipher. Not only is this advantageous because a more complete output is produced than with other ciphers, but can be more secure if bits are deliberately added or dropped, since cryptanalysis is made harder.

Processing the encrypted data in an output feedback mode may comprise: encrypting the first encryption data with the first key, $k_1$, to produce second block first encryption data, wherein performing an exclusive OR operation on the first ciphertext and the first key comprises performing an exclusive OR operation on the second block first encryption data and the second block of the first ciphertext to produce a second block of the second ciphertext.

For the xth block of the first ciphertext, processing the encrypted data in an output feedback mode may further comprise: encrypting the $(x-1)^{th}$ block first encryption data to produce xth block first encryption data; wherein performing an exclusive OR operation on the first ciphertext and the first key to produce a second ciphertext comprises performing an exclusive OR operation on the xth block first encryption data and the xth block of the first ciphertext to produce an xth block of the second ciphertext.

In this way, the method provides a synchronous stream cipher. A synchronous stream cipher can be advantageous because the production of the keystream, also referred to herein as the encryption data, is not dependent on the completion of processing performed on any block of ciphertext. Blocks of ciphertext may therefore be processed in parallel with one another, advantageously reducing the time taken to perform the method.

In one embodiment, the data encrypted with the plurality of keys, $k_1$-$k_n$, is plaintext data which has been encrypted with the plurality of keys.

The method may be implemented on a data processing apparatus, a computer program comprising instructions which, when the program is executed by a computer, cause the computer to carry out the steps of the aforementioned method, and/or a computer-readable storage medium comprising instructions which, when executed by a computer, cause the computer to carry out the steps of the method.

Figure 1:
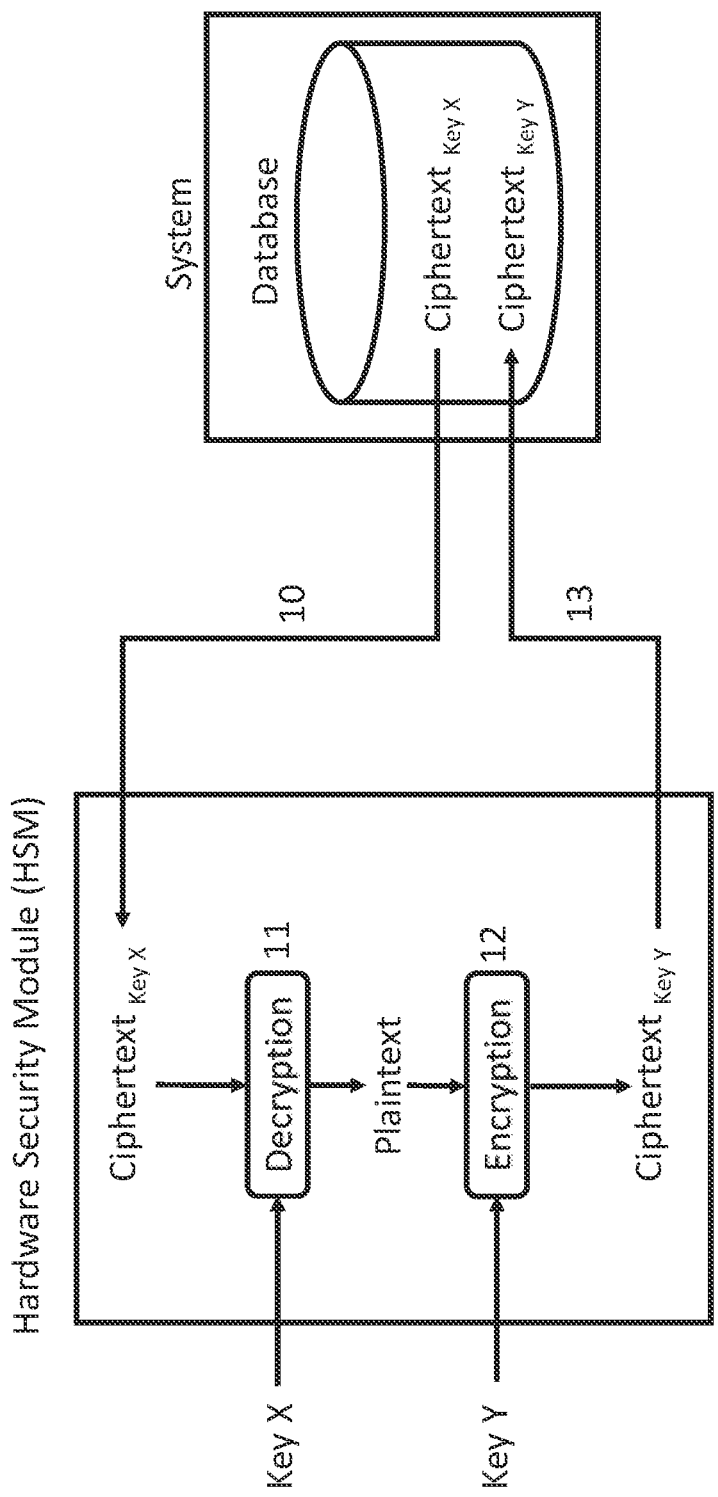
FIG. 1 illustrates a known system for processing data.
Figure 2:
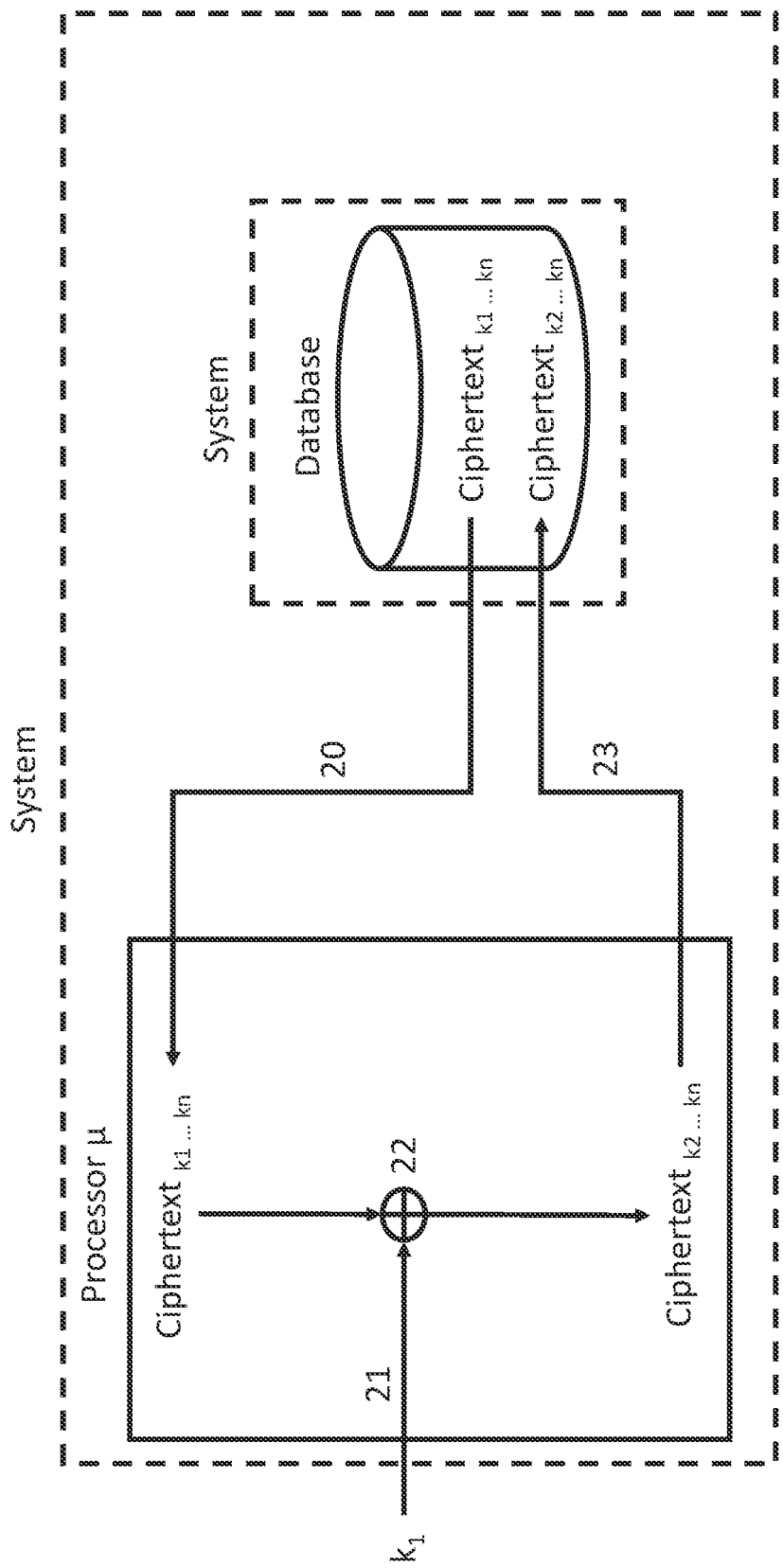

Embodiments of the invention will be described below, by way of example, with reference to the following drawings, in which:

FIG. 2 illustrates a system for processing data according to the present invention.

Figure 3B:
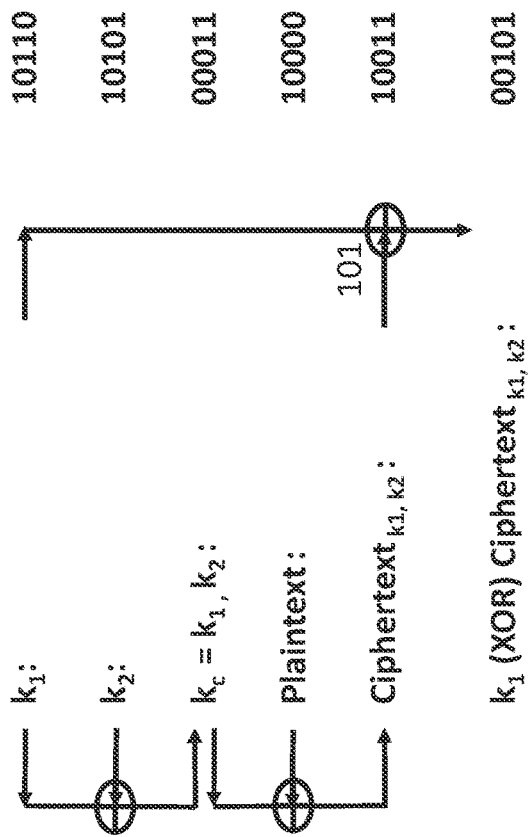
Figure 3A:
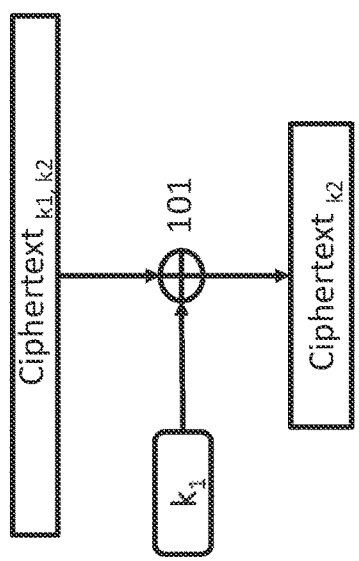

FIG. 3A illustrates a method for processing encrypted data according to an embodiment of the present invention, using only two keys.

FIG. 3B illustrates an exemplary embodiment of the method shown in FIG. 3A.

Figure 4:
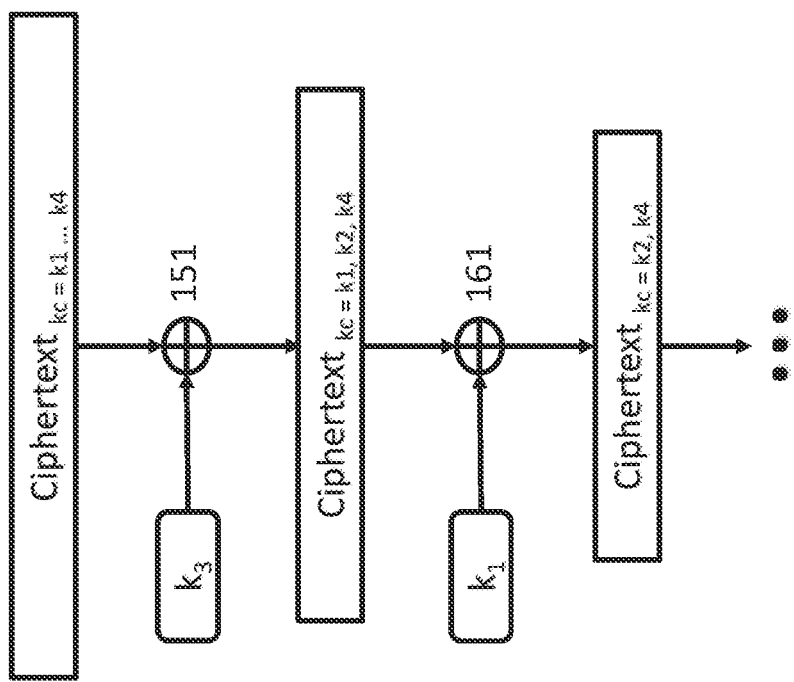

FIG. 4 illustrates a method for processing encrypted data according to an embodiment of the present invention, using a plurality of keys greater than two.

Figure 5:
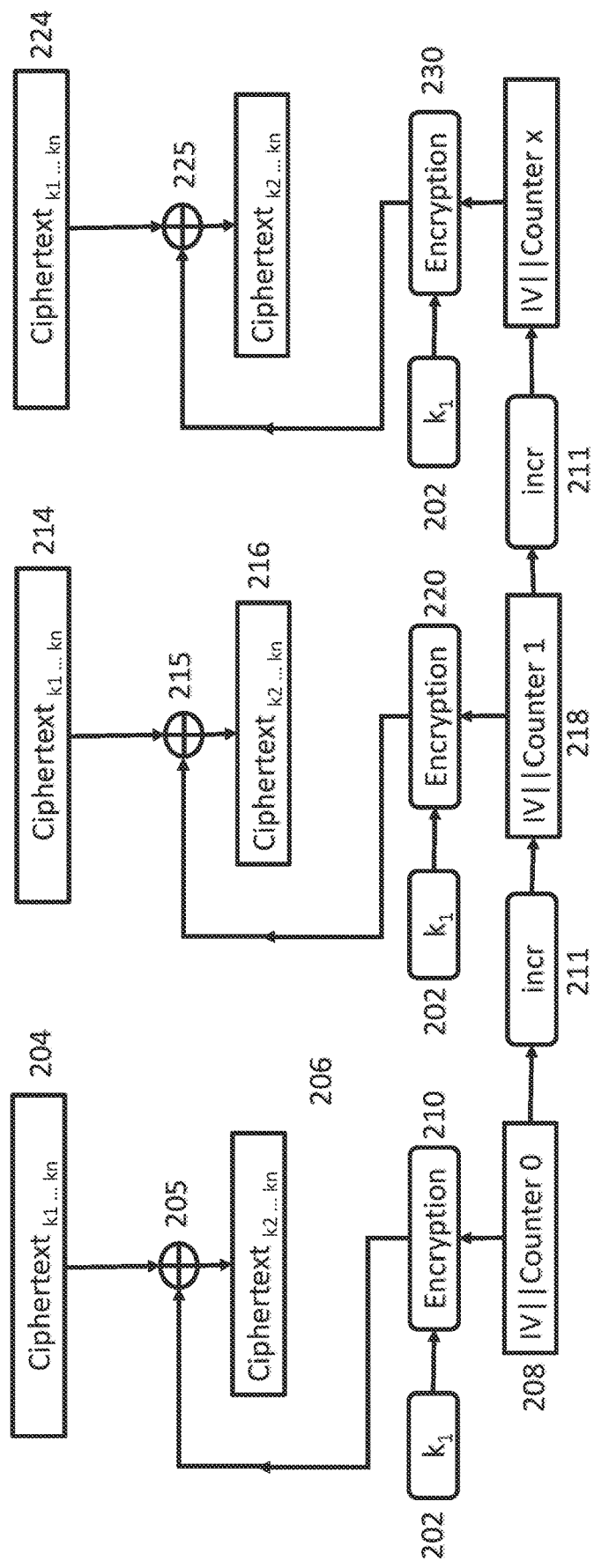

FIG. 5 illustrates a Counter-Mode (CTR) cipher performing a method of processing encrypted data according to an embodiment of the present invention.

Figure 6:
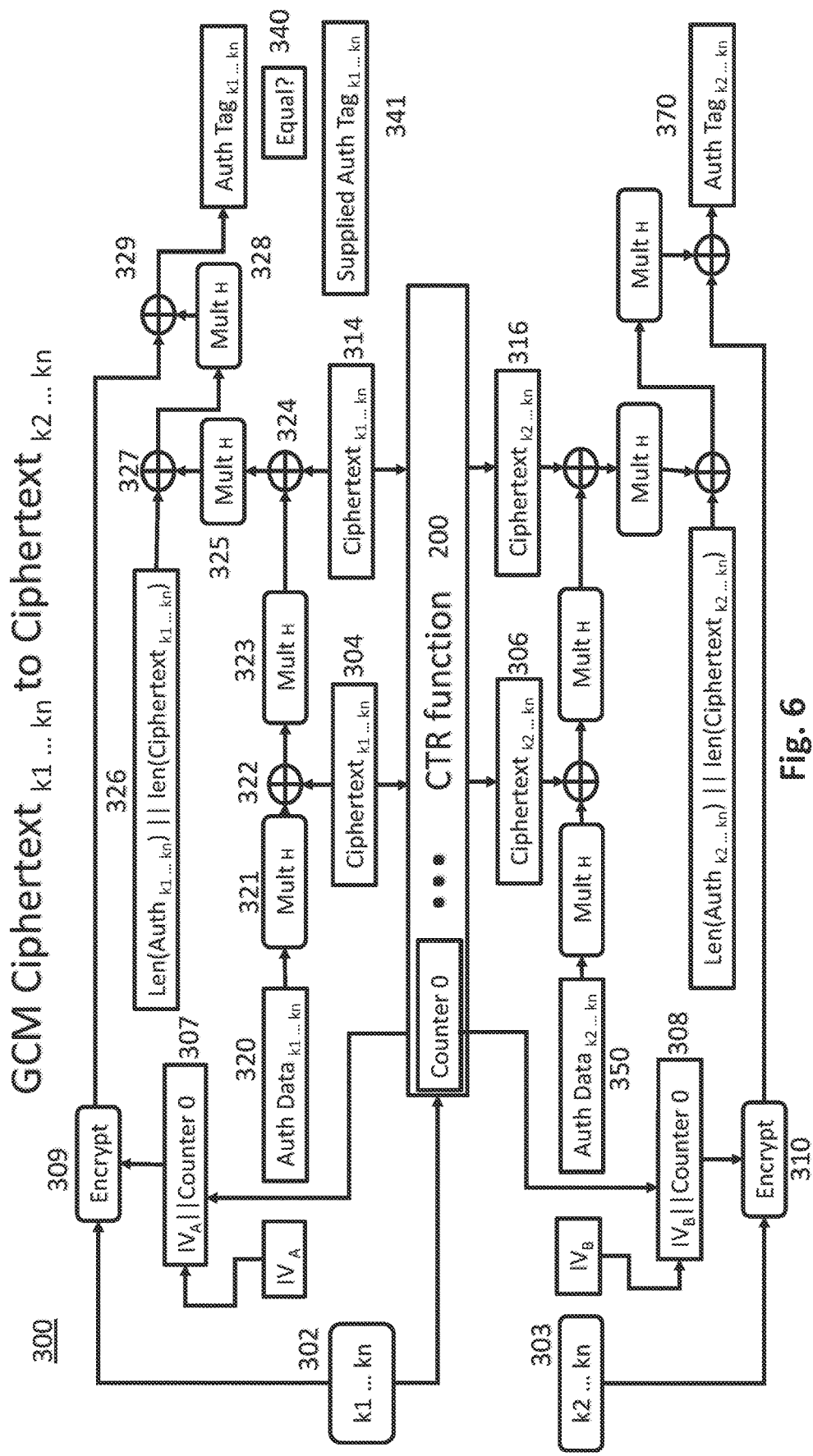

FIG. 6 illustrates a Galois/Counter-Mode (GCM) cipher performing a method of processing encrypted data according to an embodiment of the present invention.

Figure 7:
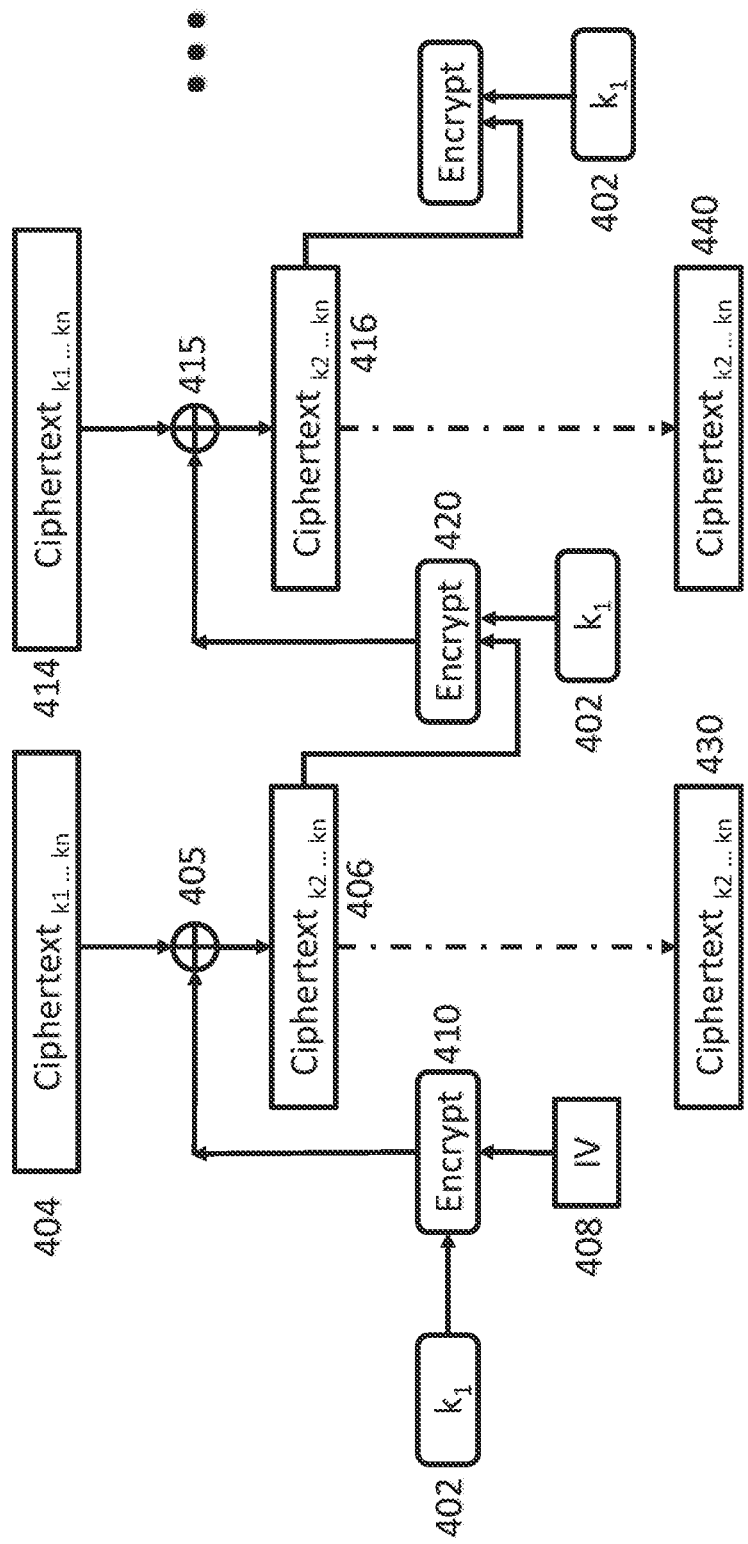

FIG. 7 illustrates a Cipher-Feedback (CFB) cipher performing a method of processing encrypted data according to an embodiment of the present invention.

Figure 8:
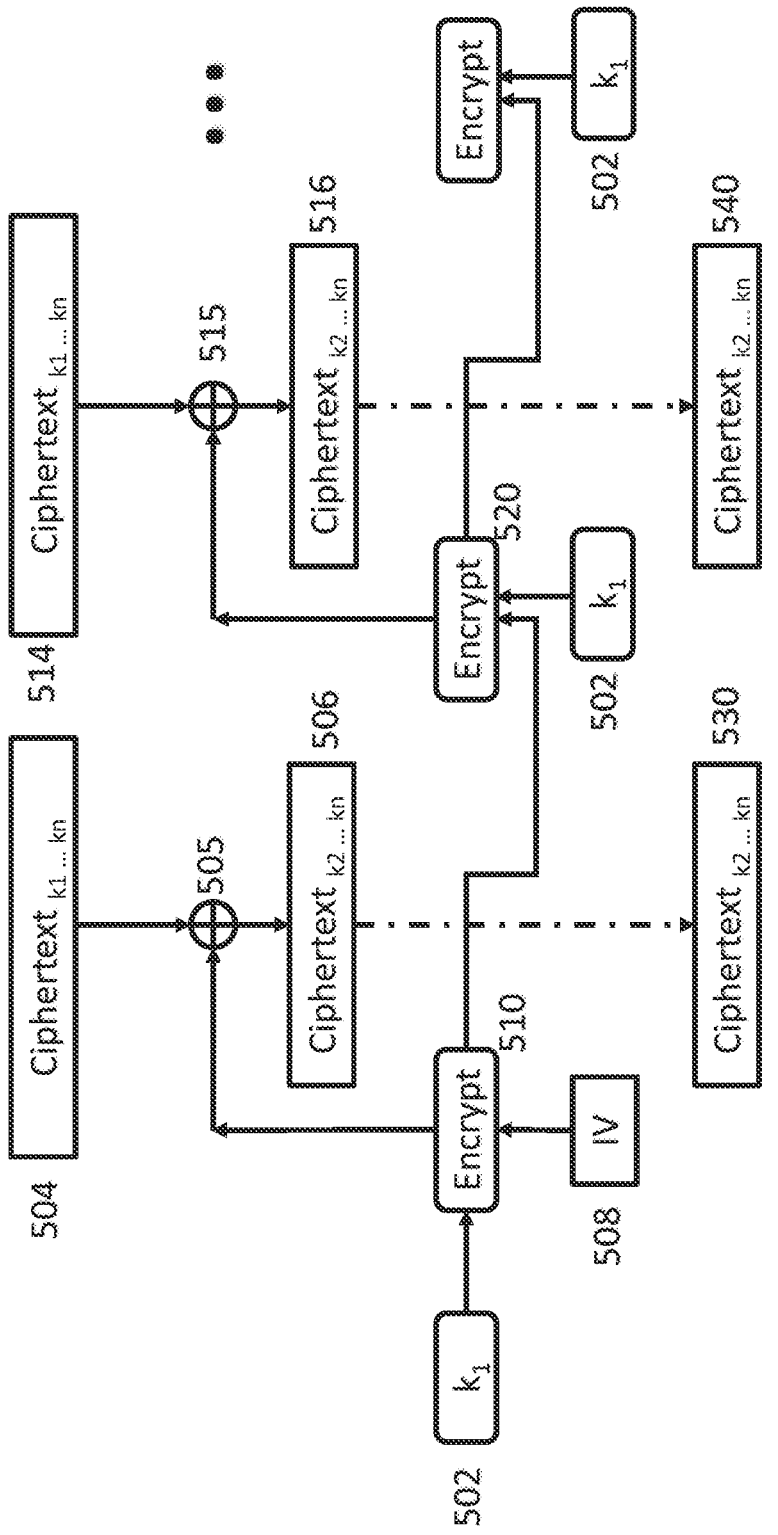

FIG. 8 illustrates an Output-Feedback (OFB) cipher performing a method of processing encrypted data according to an embodiment of the present invention.

Figure 9:
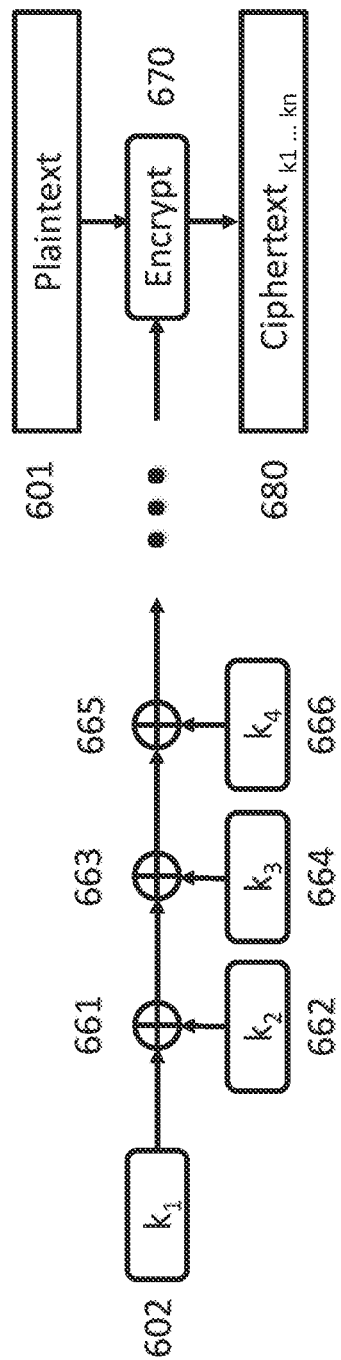

FIG. 9 illustrates a method of generating ciphertext encrypted under a plurality of keys for use with and/or in accordance with an embodiment of the present invention.

FIG. 10 illustrates a method of generating ciphertext encrypted under a plurality of keys for use with and/or in accordance with an embodiment of the present invention.

DETAILED DESCRIPTION

The invention is described below with reference to a number of different embodiments and the aforementioned drawings. These embodiments are merely illustrative and are not intended to limit the scope of the appended claims.

Referring to FIG. 2, there is disclosed a system suitably configured for performing the method of the present invention. It will be appreciated that the system may comprise a database and a processor, and that the transmissions of the ciphertexts may be internal.

Alternatively, there may be a plurality of systems, one comprising the database, another the processor, and that the transmissions of the ciphertexts may be between remote systems.

In a first step 20, ciphertext encrypted under the plurality of keys $k_1 \ldots k_n$ may be transmitted to a processor $\mu$. In a second step 21, the processor $\mu$ may receive $k_1$. It will be appreciated that $k_1$ can be received externally from outside of the system, via wireless or wired transmission, or stored at the system and transmitted to the processor $\mu$ internally.

In a third step 22, an exclusive OR operation is performed on the ciphertext encrypted under $k_1 \ldots k_n$ and $k_1$, in accordance with a method of the present invention. The product of the exclusive OR 22 is ciphertext encrypted under $k_2 \ldots k_n$, a new combined key which does not comprise $k_1$ as a component key. The ciphertext encrypted under $k_2 \ldots k_n$ is transmitted back to the database 23.

The methods described herein and shown in FIGS. 3 to 8 may be implemented in a computer processor, a data processing apparatus, a computer program comprising instructions, and/or a computer-readable storage medium.

It will be appreciated that the ciphertext encrypted under $k_2 \ldots k_n$ may be transmitted back to the same database in which the ciphertext encrypted under $k_1 \ldots k_n$ was stored. Additionally, or alternatively, the ciphertext encrypted under $k_2 \ldots k_n$ may be transmitted to any other system, for example a remote system comprising a database onto which the encrypted data is to be migrated.

The exclusive OR operation at step 22 does not, at any stage, produce plaintext. For this reason, the processor $\mu$ may be a standard processing unit without sacrificing the security of the data. The invention is not so limited, however, and the processor $\mu$ may be a hardware security module (HSM).

XOR (2 Keys)

Referring to FIG. 3A, there is a method for processing encrypted data according to an embodiment of the present invention. In particular, FIG. 3A shows a method for taking ciphertext encrypted under a plurality of keys here two, and producing ciphertext encrypted under a single encryption key.

The first encryption key may be referred to as $k_1$ and vice versa. The second encryption key may be referred to as $k_2$, and vice versa.

Ciphertext encrypted under $k_1$ and $k_2$ may be referred to as ciphertext$_{k1, k2}$ and/or first ciphertext and/or $C_1$. Ciphertext encrypted under $k_2$ may be referred to as ciphertext$_{k2}$ and/or second ciphertext. The first ciphertext has been produced according to any method of original encryption as described herein. Alternatively, the first ciphertext may have originated as ciphertext encrypted under a plurality of keys including more keys than $k_1$ and $k_2$ which has subsequently had the additional keys removed according to a method of the present invention.

A XOR operation 101 is performed on ciphertext$_{k1, k2}$ and $k_1$. The result of the XOR operation 101 is ciphertext$_{k2}$.

By way of example, FIG. 3B demonstrates the functionality of the XOR operation utilised by embodiments of the invention.

As an example, plaintext has been assigned the exemplary value of 10000, $k_1$ has been assigned the exemplary value of 10110, and $k_2$ has been assigned the exemplary value of 10101. Performing an XOR operation on Key A and Key B produces 00011, which may have been used to encrypt the plaintext. As will be described herein in greater detail, the original encryption step may not be performed by creating an initial combined key, however, for the sake of this example, this methodology is used.

Performing an XOR operation on the plaintext and $k_c$ produces ciphertext encrypted under $k_c$, 10011. Encryption of the plaintext under $k_c$ may be indicative of an original encryption step for sensitive data (the plaintext), wherein the ciphertext encrypted under $k_c$ can then be stored for later retrieval and use.

Performing the XOR operation 101 on the first key $k_1$ and the ciphertext $k_c$ produces 00101. This step may be indicative of a need to update the encryption of the plaintext, for example to update to a new key in order to comply with data security standards.

The result of an XOR operation between the original plaintext and $k_2$ can then be calculated, and produces 00101. This matches the result of the XOR operation 101. Thus, by way of the aforementioned process, the method of the present invention is capable of modifying ciphertext encrypted under $k_c$ such that it is encrypted under a new key, in this case $k_2$.

In effect, the method is able to perform decryption from one key and encryption under another key in a single operation without the underlying plaintext data being accessible or viewable at any stage in the process. Achieving this functionality by encrypting the plaintext with a combined key, comprised of a plurality of keys, and then changing the combined key by removing one of the plurality of keys, is computationally efficient and ensures that the plaintext never appears in clear. In other words, the XOR operation does not need to be performed securely, for example within a hardware security module (HSM), because an attacker will not have the opportunity to view the plaintext.

The example shown in FIG. 3B is in no way limiting on the scope of the invention. It will be appreciated that the method of the present invention may function with any plaintext, any encryption key, an encryption key of any length, any number of encryption keys making up the combined key, certain additional logical operations at any stage of the method, and any other variations that a person skilled in the art would understand not to interfere with the method. In particular, the methods of the present invention are not limited to performing an XOR operation directly on encryption keys, but also include performing an XOR operation on the product of an encryption using an encryption key, for example an encrypted initialisation vector, also known as a key stream.

XOR (4 Keys)

Referring to FIG. 4, there is a method of processing encrypted data according to an embodiment of the invention. In the exemplary method of FIG. 4, the ciphertext is shown as being encrypted under a combined key, $k_c$, made up of four keys, $k_1$, $k_2$, $k_3$, and $k_4$. It will be appreciated that the combined key may be produced using any number of keys greater than one, i.e. a plurality of keys.

In a first step 151, analogous to step 101 as illustrated in FIG. 3A, an exclusive OR operation is performed on the first ciphertext $C_1$ (ciphertext$_{kc=k1\ldots k4}$) and $k_3$ to produce a second ciphertext $C_2$ (ciphertext$_{kc=k1, k2, k4}$). The exclusive OR operation modifies the combined key $k_c$ such that it no longer includes $k_3$ as a component key, without the underlying plaintext appearing in the clear.

This process can be repeated, optionally after a predetermined period of time, for any of the remaining keys, in this example $k_1$ in an exclusive OR step 161. In this way, the encryption key under which the data, or plaintext, is encrypted can be changed a number of times, without the plaintext ever appearing in the clear. If the original plurality of keys is secure, and the final encryption key is kept secure (which is inevitable, since any operation involving the ciphertext and the final key must be sure, because plaintext will be produced), then the exclusive OR functions 151 and 161 do not need to take place in secure hardware. This is because at the moment at which the key is no longer secure, it is also no longer part of the combined key used to protect the data. Neither the key that has been removed from the combined key, nor the resulting new ciphertext, are of any use to a third party that may gain access to them.

In this way, after each iteration, the ciphertext is encrypted with a new combined key $k_c$. The security of the encryption has thus been renewed and protected against, for example, brute force type attacks which aim to break an encryption through numerous attempts at guessing a key.

Counter Mode (CTR)

In an embodiment of the present invention, the cipher used to perform the modification of the encrypted data is a counter mode block cipher (CTR).

Referring to FIG. 5, there is a method 200 of processing encrypted data according to an embodiment of the present invention. The method 200 may be referred to as a CTR function.

Ciphertext which has previously been encrypted under $k_1 \ldots k_n$, first ciphertext, is partitioned into blocks 204, 214, and 224. It will be appreciated that the first ciphertext may be partitioned into any number of blocks and that the depiction of three blocks in FIG. 5 is not limiting. Throughout this specification, the number of blocks of first ciphertext may be any number between zero (0) and a variable x. The "xth" block of first ciphertext therefore refers to a final block of first ciphertext and the $(x-1)^{th}$ block of first ciphertext refers to the penultimate block of first ciphertext. The same is true for the second ciphertext.

In some embodiments, the length of the blocks of the ciphertext encrypted under $k_1 \ldots k_n$ is equal to the lengths of the results of encryptions 210, 220, and 230, such that the XOR operations 205, 215, and 225 are performed on data strings of equal length.

An initialisation vector (IV) is generated for encryption 210 under $k_1$. In some embodiments, the initialisation vectors are randomly generated numbers. For a first block of the first ciphertext, a counter value is added to the initialisation vector. In some embodiments, the counter value for the first initialisation vector may be zero. The counter value for the first block of the first ciphertext is concatenated with the first initialisation vector to produce a second concatenated vector 208. Concatenation is shown in the figures by the following notation: '||', and may be defined as adding the counter value to the end of the initialisation vector.

The first concatenated vector 208 is encrypted at 210 under $k_1$ 202 to produce first encryption data for the first block. Encryption may be performed with any known block cipher including, but not limited to: AES, Blowfish, DES, Triple DES, Serpent, and Twofish. The encryption 210 may be performed using the same encryption that was used to encrypt the first ciphertext. The length(s) of the block(s) of ciphertext encrypted under $k_1 \ldots k_n$ may be configured for use with the block cipher used to perform the encryption. For example, when AES is used to encrypt at 210, the ciphertext encrypted under $k_1$ may be partitioned into 128 bit blocks.

An XOR operation 205 is then performed on the result of encryption 210 and the first block 204 of the ciphertext encrypted under $k_1 \ldots k_n$ to produce a first block 206 of the ciphertext encrypted under $k_2 \ldots k_n$. Ciphertext, or blocks thereof, encrypted with $k_1 \ldots k_n$ may be referred to as first ciphertext. Ciphertext, or blocks thereof, encrypted with $k_2 \ldots k_n$ may be referred to as second ciphertext.

The counter value is then incremented 211 and the new counter value concatenated with the first initialisation vector to produce an updated first concatenated vector 218. The incrementation may be any magnitude that is not zero, because in order to benefit from the advantages of a stream cipher, the updated first concatenated vector 218 must be different to the first concatenated vector 208.

The method described in relation to the first initialisation vectors and first block 204 of the ciphertext encrypted under $k_1 \ldots k_n$ is then performed using the updated initialisation vector and the second block 214 of the ciphertext encrypted under $k_1 \ldots k_n$.

The updated first concatenated vector 218 is encrypted at 210 under $k_1$ 202 to produce first encryption data for the second block. Although the concatenated vector has been updated, the key and the encryption algorithms used to encrypt the initialisation vector may remain the same as those used in relation to the first block 204 of the ciphertext.

An XOR operation 215 is then performed on the result of encryption 215 and the second block 214 of the ciphertext encrypted under $k_1 \ldots k_n$ to produce a second block 216 of the ciphertext encrypted under $k_2 \ldots k_n$.

Optionally, the first and second blocks of the ciphertext encrypted under $k_2 \ldots k_n$ may be concatenated in order to be further manipulated or stored.

The incrementation step, concatenation steps, encryption steps, and XOR operations are then repeated for each block of the ciphertext encrypted under $k_1 \ldots k_n$ until, for x blocks of ciphertext, the steps have been performed on the xth block 224 of the ciphertext encrypted under $k_1 \ldots k_n$ to produce the xth block 226 of the ciphertext encrypted under $k_2 \ldots k_n$. The entirety of the ciphertext originally encrypted under $k_1 \ldots k_n$ is now encrypted under $k_2 \ldots k_n$.

Optionally, the blocks of the ciphertext encrypted under $k_2 \ldots k_n$ may then be concatenated in order to be further manipulated or stored.

GCM

In an embodiment of the invention, the cipher used to perform the modification of the encrypted data is a Galois/Counter Mode block cipher.

Referring to FIG. 6, there is a method of processing encrypted data according to an embodiment of the present invention.

The method is based on the counter-mode (CTR) function 200 shown in FIG. 5. FIG. 6 shows two blocks of ciphertext 304 and 314 encrypted under $k_1 \ldots k_n$, however, it will be appreciated that the method can be performed on any number of blocks of ciphertext, for example three blocks of ciphertext as depicted in FIG. 5.

The method incorporates the CTR function 200 into a Galois mode of authentication. In this way, and as previously detailed, the method provides authentication and encryption (authenticated encryption) in one method and can benefit from increased processing efficiency due to the ability to apply parallel processing.

The blocks of ciphertext 304 and 314 encrypted under $k_1 \ldots k_n$ are fed as inputs to the CTR function 200, so may be considered to be equivalent to blocks of ciphertext 204 and 214 in FIG. 5. $k_1 \ldots k_n$ 302 and $k_2 \ldots k_n$ 303 are also fed as inputs to the CTR function 200. The method 300 may therefore include a step of calculating $k_2 \ldots k_n$ 303. Although not shown, $k_1$ is also input to the CTR function 200 as per FIG. 5.

Two initialisation vectors are generated, one initialisation vector, referred to herein as the first initialisation vector, ($IV_A$) to be encrypted under $k_1 \ldots k_n$ 302 and one initialisation vector, referred to herein as the second initialisation vector, ($IV_B$) to be encrypted under $k_2 \ldots k_n$ 303. The initialisation vector $IV_B$ may be fed as an input to the CTR function 200. The CTR function 200 operates in the same manner as described in relation to CTR swap function 200 to produce blocks of ciphertext 306 and 316 encrypted under $k_2 \ldots k_n$.

First authentication data 320 (Auth Data $k_1 \ldots k_n$), the blocks of ciphertext 304 and 314 encrypted under $k_1 \ldots k_n$, the length of the first authentication data, and the length of the entire ciphertext encrypted under $k_1 \ldots k_n$ are used in a Galois authentication method to generate a first authentication tag 340 (Auth Tag $k_1 \ldots k_n$). A supplied authentication tag 341 (Supplied Auth Tag $k_1 \ldots k_n$) can then be compared to the generated first authentication tag 340 to authenticate the ciphertext encrypted under $k_1 \ldots k_n$.

The Galois authentication method may operate as follows. Galois field multiplication (Mult H) is performed on the first authentication data 320 at step 321, and a XOR operation 322 is then performed on the result of step 321 and the first block 304 of the ciphertext encrypted under $k_1 \ldots k_n$. The result of XOR operation 322 may be referred to as the start of a first authentication stream. Galois field multiplication is then performed on the result of XOR operation 322 at step 323 to continue the first authentication stream. A XOR operation 324 is then performed on the result of step 323 and the second block 314 of the ciphertext encrypted under $k_1 \ldots k_n$. For each block of the ciphertext encrypted under $k_1 \ldots k_n$, Galois field multiplication is performed on the authentication stream, and then a XOR operation is performed on the result of the Galois field multiplication and the next block of the ciphertext encrypted under $k_1 \ldots k_n$. This process repeats until the final block of the ciphertext encrypted under $k_1 \ldots k_n$ has been incorporated, via a XOR operation, into the authentication stream. In FIG. 6, this is after Galois field multiplication at step 325.

A first length authentication vector 326 is generated by calculating the length of the first authentication data 320 and the length of the ciphertext encrypted under $k_1 \ldots k_n$. The length of the first authentication data and the length of the ciphertext encrypted under $k_1 \ldots k_n$ are then concatenated to produce the first length authentication vector 326. At step 327, a XOR operation is performed on the final Galois field multiplication 325 of the authentication stream and the length authentication vector 326. Galois field multiplication 328 is then performed on the result of the XOR operation 327.

The first initialisation vector $IV_A$ is concatenated with the first counter value to produce a first concatenated vector 307, which is then encrypted with $k_1 \ldots k_n$ 302 at step 309. A XOR operation 329 is performed on the product of encryption 309 and the product of Galois field multiplication 328 to generate the first authentication tag 340. If the generated first authentication tag 340 is identical to the supplied authentication tag 341, which was produced when the ciphertext was initially encrypted under $k_1 \ldots k_n$, then the ciphertext encrypted under $k_1 \ldots k_n$ that has been used for the CTR swap function has been authenticated. In other words, it is confirmed that the ciphertext encrypted under $k_1 \ldots k_n$ has not been modified since its original encryption under $k_1 \ldots k_n$. In this way, it is also confirmed that the ciphertext encrypted under $k_1 \ldots k_n$ has been sent by an authentic sender. This is particularly advantageous for the present method because the plaintext never appears in clear, so there cannot be an authentication step based on the plaintext.

Second authentication data 321 (Auth Data $k_2 \ldots k_n$), the blocks of ciphertext 306 and 316 encrypted under $k_2 \ldots k_n$, the length of the second authentication data, and the length of the entire ciphertext encrypted under $k_2 \ldots k_n$ are used to generate a second authentication tag 370 (Auth Tag $k_2 \ldots k_n$). The process by which the second authentication tag 370 is generated may be the same as that used to generate the first authentication tag 340, but using the second authentication data 350 and the ciphertext encrypted under $k_2 \ldots k_n$.

An authentication tag may also be referred to as a message authentication code (MAC). An authentication tag or MAC provides message authentication because it is generated using the initialisation vector, the key, the authentication data, and the length of the ciphertext, so cannot be forged by a third party who does not possess all of those pieces of information, including the key.

CFB

In an embodiment of the present invention, the cipher used to perform the modification of the encrypted data is a cipher feedback mode block cipher.

Referring to FIG. 7, there is a method 400 of processing encrypted data according to an embodiment of the present invention. The method 400 may be referred to as a CFB swap function.

Ciphertext which has previously been encrypted under $k_1 \ldots k_n$ is partitioned into blocks 404 and 414. It will be appreciated that the ciphertext may be partitioned into any number of blocks and that the depiction of two blocks in FIG. 7 is not limiting.

In some embodiments, the length of the blocks of ciphertext encrypted under $k_1 \ldots k_n$ is equal to the length of the result of encryption 410, such that the XOR operations 405 and 415 are performed on data strings of equal length.

A first initialisation vector (IV) 408 is generated to be encrypted under $k_1$ 402. In some embodiments, the initialisation vectors are randomly generated numbers.

The first initialisation vector 408 is encrypted at 410 under $k_1$ 402 to produce first encryption data for the first block. Encryption may be performed with any known algorithm(s) including, but not limited to, algorithms listed above in relation to the CTR function illustrated in FIG. 5.

An XOR operation 405 is then performed on the product of encryption 410 and the first block 404 of the ciphertext encrypted under $k_1 \ldots k_n$ to produce a first block 406 of the ciphertext encrypted under $k_2 \ldots k_n$. Ciphertext, or blocks thereof, encrypted with $k_1 \ldots k_n$ may be referred to as first ciphertext. Ciphertext, or blocks thereof, encrypted with $k_2 \ldots k_n$ may be referred to as second ciphertext.

A copy 430 of the first block 406 of the ciphertext encrypted under $k_2 \ldots k_n$ may be output by the method, or stored, for later concatenation with additional blocks of ciphertext encrypted under $k_2 \ldots k_n$.

The first block 406 of the ciphertext encrypted under $k_2 \ldots k_n$ is then encrypted 420 under $k_1$ to produce first encryption data for the second block.

An XOR operation 415 is then performed on the product of encryption 420 and the second block 414 of the ciphertext encrypted under $k_2 \ldots k_n$ to produce a second block 416 of the ciphertext encrypted under $k_2 \ldots k_n$. A copy 440 of the second block 416 of the ciphertext encrypted under $k_2 \ldots k_n$ may be output by the method, or stored, for later concatenation with earlier and/or additional blocks of ciphertext encrypted under $k_2 \ldots k_n$. For example, in one embodiment of the invention where the ciphertext encrypted under $k_2 \ldots k_n$ has been split into two blocks, such that two blocks of ciphertext encrypted under $k_2 \ldots k_n$ are generated, the copies of the two blocks of ciphertext encrypted under $k_2 \ldots k_n$ may be concatenated and stored together.

The encryption of the previous block of ciphertext encrypted under $k_2 \ldots k_n$, and the XOR operation, are then repeated for each block of the ciphertext encrypted under $k_1 \ldots k_n$ until, for x blocks of ciphertext, the steps have been performed on the xth block of the ciphertext encrypted under $k_1 \ldots k_n$ to produce the xth block of the ciphertext encrypted under $k_2 \ldots k_n$. The entirety of the ciphertext originally encrypted under $k_1 \ldots k_n$ is now encrypted under $k_2 \ldots k_n$.

The CFB function may be described as further encrypting the most recent block of the second ciphertext, and performing an XOR operation on the generated encryption data and the next block of the ciphertext encrypted under $k_1 \ldots k_n$ in order to produce the next block of ciphertext encrypted under $k_2 \ldots k_n$.

OFB

In an embodiment of the present invention, the cipher used to perform the modification of the encrypted data is an output feedback mode block cipher.

Referring to FIG. 8, there is a method 500 of processing encrypted data according to an embodiment of the present invention. The method 500 may be referred to as a OFB function.

The steps to perform a method of the invention as an OFB cipher are the same as those to perform a CFB cipher, with the exception that it is the result of the encryption 510 of the previous block that is "fed-back" into the function, and re-encrypted at 520. For completeness, an OFB method according to an embodiment of the present invention is detailed below.

Ciphertext which has previously been encrypted under $k_2 \ldots k_n$ is partitioned into blocks 504 and 514. It will be appreciated that the ciphertext may be partitioned into any number of blocks and that the depiction of two blocks in FIG. 8 is not limiting.

In some embodiments, the length of the blocks of ciphertext encrypted under $k_2 \ldots k_n$ is equal to the length of the result of encryption 510, such that the XOR operations 505 and 505 are performed on data strings of equal length.

A first initialisation vector (IV) 508 is generated to be encrypted under $k_1$ 502. In some embodiments, the initialisation vectors are randomly generated numbers.

The first initialisation vector 508 is encrypted at 510 under $k_1$ 502 to produce first encryption data for the first block. Encryption may be performed with any known algorithm(s) including, but not limited to, algorithms listed above in relation to the CTR function illustrated in FIG. 5.

An XOR operation 505 is then performed on the product of encryption 510 and the first block 504 of the ciphertext encrypted under $k_1 \ldots k_n$ to produce a first block 506 of the ciphertext encrypted under $k_2 \ldots k_n$. Ciphertext, or blocks thereof, encrypted with $k_1 \ldots k_n$ may be referred to as first ciphertext. Ciphertext, or blocks thereof, encrypted with $k_2 \ldots k_n$ may be referred to as second ciphertext.

A copy 530 of the first block 506 of the ciphertext encrypted under $k_2 \ldots k_n$ may be output by the method, or stored, for later concatenation with additional blocks of ciphertext encrypted under $k_2 \ldots k_n$.

The product of encryption 510 is then encrypted 520 under $k_1$ to produce first encryption data for the second block.

An XOR operation 515 is then performed on the product of encryption 520 and the second block 514 of the ciphertext encrypted under $k_2 \ldots k_n$ to produce a second block 516 of the ciphertext encrypted under $k_2 \ldots k_n$. A copy 540 of the second block 516 of the ciphertext encrypted under $k_2 \ldots k_n$ may be output by the method, or stored, for later concatenation with earlier and/or additional blocks of ciphertext encrypted under $k_2 \ldots k_n$. For example, in one embodiment of the invention where the ciphertext encrypted under $k_2 \ldots k_n$ has been split into two blocks, such that two blocks of ciphertext encrypted under $k_2 \ldots k_n$ are generated, the copies of the two blocks of ciphertext encrypted under $k_2 \ldots k_n$ may be concatenated and stored together.

The encryption of the result of the previous encryption, and the XOR operation, are then repeated for each block of the ciphertext encrypted under $k_1 \ldots k_n$ until, for x blocks of ciphertext, the steps have been performed on the xth block of the ciphertext encrypted under $k_1 \ldots k_n$ to produce the xth block of the ciphertext encrypted under $k_2 \ldots k_n$. The entirety of the ciphertext originally encrypted under $k_1 \ldots k_n$ is now encrypted under $k_2 \ldots k_n$.

The CFB function may be described as further encrypting the most recent encryption product, and performing an XOR operation on the generated encryption data and the next block of the ciphertext encrypted under $k_1 \ldots k_n$ in order to produce the next block of ciphertext encrypted under $k_2 \ldots k_n$.

Encryption

Throughout the foregoing description and in the accompanying Fig. s, 'encryption' and 'encryption algorithm' have been used to describe a mathematical operation, or mathematical operations, used to encode data. Methods of the present invention may be performed with any known block cipher including, but not limited to: AES, Blowfish, DES, Triple DES, Serpent, and Twofish.

Keys $k_1 \ldots k_n$

Throughout the foregoing description and in the accompanying figures, '$k_1 \ldots k_n$' has been used to represent the key under which the ciphertext is encrypted before the method of the present invention is performed, and '$k_2 \ldots k_n$' has been used to represent the key under which the ciphertext is encrypted after the method of the present invention has been performed. Both may be referred to as a combined key $k_c$; the combined key refers to those keys that originally encrypted the data, or plaintext, and have not subsequently been "removed" by a method according to the present invention. Repetitions of the exemplary methods described herein may result in ciphertext encrypted under $k_3 \ldots k_n$, $k_4 \ldots k_n$, and so on.

Although the key nomenclature of $k_1$ has been used to denote the key being removed from the encryption, it will be appreciated that this is for ease of understanding only, and does not refer to a first key used to encrypt the original plaintext, or to any other particular order. Which of the plurality of keys is removed from the encryption at which stage may be entirely arbitrary, and selected randomly, or may be selected deliberately, for example according to a plan determined when the plaintext was originally encrypted.

Keys $k_1 \ldots k_n$ may be random numbers or may be generated in any way known to generate encryption keys, for example symmetric encryption keys for use in symmetric encryption/decryption.

Encryption of the Plaintext

As has been noted previously, the steps relating to encryption of the plaintext in order to obtain the first ciphertext ($C_1$, or ciphertext$_{k1 \ldots kn}$) may be performed as part of the method of the present invention, or may have occurred previously, the method of the present invention beginning with receiving a first ciphertext of this form.

Referring to FIG. 9, the first ciphertext may be generated according to method 600. In this method, a plurality of keys, here $k_1$ 602, $k_2$ 662, $k_3$ 664, and $k_4$ 666, have been received by a system or computing apparatus at which the method is to be performed. Plaintext 601 has also been received.

Sequential exclusive OR operations 661, 663, and 665 are then performed. First, an exclusive OR operation 661 combines $k_1$ with $k_2$ to produce a first partially combined key $k_p$ (not shown). Then, a second exclusive OR operation 663 combines the partially combined key $k_p$ with $k_3$ to produce an updated partially combined key. Finally, a fourth exclusive OR operation 665 combines the partially combined key $k_p$ with $k_4$ to produce, in this example using only four keys, combined key $k_c$.

The combined key $k_c$ is then used to encrypt 670 the plaintext 601 to produce ciphertext 680 encrypted under $k_c$, i.e. encrypted under $k_1 \ldots k_n$. The encryption algorithm may be any encryption algorithm known to the skilled person, including, but not limited to, the encryption algorithms mentioned herein.

Referring to FIG. 10, the first ciphertext may be generated according to method 700. In this method, a plurality of keys, here $k_1$ 702, $k_2$ 762, and $k_3$ 764, have been received by a system or computing apparatus at which the method is to be performed. Plaintext 701 has also been received.

Sequential encryption steps 772, 774, and 776 are then performed. First, an encryption step 772 encrypts plaintext 701 with $k_1$ 702. The result of encryption step 772 is then encrypted 774 with $k_2$ 762, and the result of encryption 774 then encrypted with $k_3$ 776. With three keys, the result of encryption step 776 is ciphertext 780 under $k_1 \ldots k_n$. The encryption algorithm may be any encryption algorithm known to the skilled person, including, but not limited to, the encryption algorithms mentioned herein.

As stated above, for either the method of FIG. 9 or FIG. 10, it will be appreciated that the numbering of the keys is for ease of understanding only, and that a plurality of keys may be used to encrypt plaintext in any order desired by the person skilled in the art. Throughout this specification, "n" is used to represent a number of keys in the original plurality of keys, thus $k_1 \ldots k_n$, represents the plurality of keys.

Numbered Embodiments of the Invention

1. A computer-implemented method for processing a first ciphertext, $C_1$, wherein the first ciphertext is data encrypted with a plurality of keys, $k_1 \ldots k_n$, the method comprising:
   receiving a first key, $k_1$, wherein the first key is one of the plurality of keys;
   receiving the first ciphertext, $C_1$; and
   performing an exclusive OR operation on the first ciphertext, $C_1$, and the first key, $k_1$, to produce a second ciphertext, $C_2$, such that the second ciphertext, $C_2$, is the data encrypted with the plurality of keys $k_2 \ldots k_n$, and not with the first key, $k_1$.

2. The computer-implemented method of claim 1, further comprising:
   receiving a further key, $k_i$, i={2 ... n};
   receiving ciphertext $C_i$; and
   performing an exclusive OR operation on the ciphertext $C_i$ and the further key, $k_i$, to produce ciphertext $C_{i+1}$, such that the ciphertext $C_{i+1}$ is the data encrypted with the plurality of keys $k_{i+1} \ldots k_n$, and not with the keys $k_1 \ldots k_i$.

3. The computer-implemented method of embodiment 2, further comprising:
   iteratively repeating the steps of embodiment 2 once for each remaining key of the plurality of keys $k_{i+1} \ldots k_n$, wherein, after each iteration, the ciphertext is encrypted with one fewer key, and wherein, after all of the iterations, the data is no longer encrypted with any of the plurality of keys.

4. The computer-implemented method of embodiment 3, wherein the performance of each iteration is separated by a predetermined time period.

5. The computer-implemented method of embodiment 4, wherein the predetermined time period is equal to or less than a crypto period of the keys in the plurality of keys.

6. The computer-implemented method of any preceding embodiment, further comprising:
   receiving the data as plaintext;
   receiving the plurality of keys $k_1 \ldots k_n$; and
   encrypting the plaintext with the plurality of keys $k_1 \ldots k_n$ to produce the first ciphertext, $C_1$.

7. The method of embodiment 6, wherein the step of encrypting the plaintext comprises:
  combining the plurality of keys, $k_1 \ldots k_n$, with exclusive OR operations to produce a combined key, $k_c$; and
  performing an encryption operation on the plaintext with the combined key $k_c$.

8. The method according to embodiment 7, wherein the step of combining the plurality of keys, $k_1 \ldots k_n$, comprises:
  (a) performing an exclusive OR operation on two distinct keys, $k_i$ and $k_{i+1}$, of the plurality of keys $k_1 \ldots k_n$, to produce a partially combined key, $k_p$;
  (b) updating the partially combined key, $k_p$, by performing an exclusive OR operation on the partially combined key, $k_p$, and a key, $k_{i+2}$, of the plurality of keys $k_1 \ldots k_n$; and
  (c) repeating step (b) for each successive key of the plurality of keys $k_1 \ldots k_n$, to produce the combined key $k_c$.

9. The method of embodiment 6, wherein encrypting the plaintext comprises:
  (a) encrypting the plaintext with a key, $k_i$, of the plurality of keys $k_1 \ldots k_n$; and
  (b) successively encrypting the output of step (a) with each remaining key, $k_{i+1} \ldots k_n$ of the plurality of keys, thereby producing the first ciphertext, $C_1$.

10. The method according to any preceding embodiment, wherein the first ciphertext comprises a plurality of blocks and wherein the method is implemented using a block cipher.

11. The method according to embodiment 10, wherein a mode of operation of the block cipher is: counter mode; or Galois/counter mode; or output feedback mode; or cipher feedback mode.

12. The method according to embodiment 11, wherein the mode of operation is counter mode, and wherein, for a first block of the first ciphertext, producing the second ciphertext further comprises:
  concatenating a first initialisation vector and a first counter value to produce a first concatenated vector;
  producing first encryption data by encrypting the first concatenated vector with the first key, $k_1$; and
  performing the exclusive OR operation on the first encryption data and the first ciphertext.

13. The method according to embodiment 12, wherein the first ciphertext comprises x blocks, and wherein for each of the second to xth blocks of the first ciphertext, the method further comprises:
  incrementing the counter value; and
  repeating the method of embodiment 12 using the incremented counter value.

14. The method according to any one of embodiments 11 to 13, wherein the mode of operation is Galois/counter mode, and wherein the method further comprises:
  receiving a first authentication tag associated with the first ciphertext;
  receiving a second authentication tag associated with the second ciphertext;
  computing a third authentication tag using a Galois message authentication code function with the first ciphertext as the key;
  computing a fourth authentication tag using a Galois message authentication code function with the second ciphertext as the key;
  comparing the first and third authentication tags; and
  comparing the second and fourth authentication tags.

15. The method according to embodiment 14, wherein computing the third authentication tag comprises:
  i) performing Galois field multiplication on first authentication data to produce a first authentication stream;
  ii) performing an exclusive OR operation on the first authentication stream and the first block of the first ciphertext;
  iii) performing Galois field multiplication on the product of step ii;
  iv) repeating steps ii and iii for every block of the first ciphertext;
  v) performing Galois field multiplication on the product of step iv;
  vi) performing an exclusive OR operation on the product of step v and a first length authentication vector, wherein the length authentication vector is a length of the first authentication data concatenated with a length of the first ciphertext;
  vii) performing Galois field multiplication on the product of step vi; and
  viii) performing an exclusive OR operation on the product of step vii and the first encryption data.

16. The method according to embodiment 14, wherein computing the fourth authentication tag comprises performing the method of embodiment 15 on second authentication data, the second ciphertext, a second length authentication vector, and the second encryption data, wherein the second length authentication vector is a length of the second authentication data concatenated with a length of the second ciphertext.

17. The method according to embodiment 11, wherein for a first block of the first ciphertext, producing the second ciphertext further comprises:
  encrypting a first initialisation vector with the first key, $k_1$, to produce first encryption data;
  performing the exclusive OR operation on the first encryption data and the first ciphertext.

18. The method according to embodiment 17, wherein the mode of operation is cipher feedback mode, wherein the first ciphertext comprises x blocks and wherein the second ciphertext comprises x blocks, and wherein for the $x^{th}$ block of the first ciphertext, producing the second ciphertext further comprises:
  i) encrypting the $(x-1)^{th}$ block of the second ciphertext with the first key, $k_1$,
  wherein performing an exclusive OR operation on the first ciphertext and the first key comprises performing an exclusive OR operation on the product of step i and the $x^{th}$ block of the first ciphertext to produce an $x^{th}$ block of the second ciphertext.

19. The method according to embodiment 17, wherein the mode of operation is output feedback mode, wherein the first ciphertext comprises x blocks and wherein the second ciphertext comprises x blocks, and wherein for the second block of the first ciphertext, producing the second ciphertext further comprises:
  encrypting the first encryption data with the first key, $k_1$, to produce second block first encryption data,
  wherein performing an exclusive OR operation on the first ciphertext and the first key comprises performing an exclusive OR operation on the second block first encryption data and the second block of the first ciphertext to produce a second block of the second ciphertext.

20. The method according to embodiment 19, wherein for the $x^{th}$ block of the first ciphertext, producing the second ciphertext further comprises:
  encrypting the $(x-1)^{th}$ block first encryption data to produce $x^{th}$ block first encryption data;

wherein performing an exclusive OR operation on the first ciphertext and the first key to produce a second ciphertext comprises performing an exclusive OR operation on the $x^{th}$ block first encryption data and the $x^{th}$ block of the first ciphertext to produce an $x^{th}$ block of the second ciphertext.

21. The method according to any one of embodiments 1 to 20, wherein the data encrypted with the plurality of keys, $k_1$-$k_n$, is plaintext data which has been encrypted with the plurality of keys.

22. A data processing apparatus comprising means for carrying out the steps of any preceding method embodiment.

23. A computer program comprising instructions which, when the program is executed by a computer, cause the computer to carry out the steps of any preceding method embodiment.

24. A computer-readable storage medium comprising instructions which, when executed by a computer, cause the computer to carry out the steps of any preceding method embodiment.

It will be appreciated that the invention has been described above by way of example only, and that modifications may be made within the scope of the invention as defined by the appendant claims.

The invention claimed is:

1. A computer-implemented method for processing a first ciphertext, $C_1$, wherein the first ciphertext is data encrypted with a plurality of keys, $k_1 \ldots k_n$, the method comprising:
   receiving a first key, $k_1$, wherein the first key is one of the plurality of keys;
   receiving the first ciphertext, $C_1$;
   performing an exclusive OR operation on the first ciphertext, $C_1$, and the first key, $k_1$, to produce a second ciphertext, $C_2$, such that the second ciphertext, $C_2$, is the data encrypted with the plurality of keys, $k_2 \ldots k_n$, and not with the first key, $k_1$;
   receiving a further key, $k_2$;
   receiving the second ciphertext, $C_2$; and
   after a predetermined time period equal to or less than a crypto period of the keys in the plurality of keys, performing an exclusive OR operation on the second ciphertext, $C_2$, and the further key, $k_2$, to produce a third ciphertext, $C_3$, such that the third ciphertext, $C_3$, is the data encrypted with the plurality of keys, $k_3 \ldots k_n$, and not with the first and further keys $k_1$, $k_2$.

2. The computer-implemented method of claim 1, further comprising:
   iteratively repeating the performance, separated by the predetermined time period, of an exclusive OR operation once for each remaining key of the plurality of keys ki+1 . . . kn, wherein, after each iteration, the ciphertext is encrypted with one fewer key, and wherein, after all of the iterations, the data is no longer encrypted with any of the plurality of keys.

3. The computer-implemented method of claim 1, further comprising:
   receiving the data as plaintext;
   receiving the plurality of keys, k1 . . . kn; and
   encrypting the plaintext with the plurality of keys, k1 . . . kn, to produce the first ciphertext, C1.

4. The computer-implemented method of claim 3, wherein the step of encrypting the plaintext comprises:
   combining the plurality of keys, k1 . . . kn, with exclusive OR operations to produce a combined key, kc; and
   performing an encryption operation on the plaintext with the combined key, kc.

5. The computer-implemented method of claim 3, wherein encrypting the plaintext comprises:
   encrypting the plaintext with a key, $k_i$, of the plurality of keys, $k_1 \ldots k_n$; and
   successively encrypting the output of step (a) with each remaining key, $k_{i+1} \ldots k_n$, of the plurality of keys, thereby producing the first ciphertext, $C_1$.

6. The computer-implemented method of claim 4, wherein the step of combining the plurality of keys, k1 . . . kn, comprises:
   (a) performing an exclusive OR operation on two distinct keys, $k_i$ and $k_{i+1}$, of the plurality of keys, $k_1 \ldots k_n$, to produce a partially combined key, $k_p$;
   (b) updating the partially combined key, $k_p$, by performing an exclusive OR operation on the partially combined key, $k_p$, and a key, $k_{i+2}$, of the plurality of keys $k_1 \ldots k_n$; and
   (c) repeating step (b) for each successive key of the plurality of keys, $k_1 \ldots k_n$, to produce the combined key, $k_c$.

7. The computer-implemented method of claim 1, wherein the first ciphertext comprises a plurality of blocks, and wherein the method is implemented using a block cipher, optionally wherein a mode of operation of the block cipher is:
   counter mode;
   Galois/counter mode;
   output feedback mode; or
   cipher feedback mode.

8. The computer-implemented method of claim 7, wherein the mode of operation is counter mode, and wherein, for a first block of the first ciphertext, producing the second ciphertext further comprises:
   concatenating a first initialisation vector and a first counter value to produce a first concatenated vector;
   producing first encryption data by encrypting the first concatenated vector with the first key, $k_1$; and
   performing the exclusive OR operation on the first encryption data and the first ciphertext, optionally wherein the first ciphertext comprises x blocks, and wherein for each of the second to $x^{th}$ blocks of the first ciphertext, the method further comprises:
   incrementing the counter value; and
   repeating the method of claim 7 using the incremented counter value.

9. The computer-implemented method of claim 7, wherein the mode of operation is Galois/counter mode, and wherein the method further comprises:
   receiving a first authentication tag associated with the first ciphertext;
   receiving a second authentication tag associated with the second ciphertext;
   computing a third authentication tag using a Galois message authentication code function with the first ciphertext as the key;
   computing a fourth authentication tag using a Galois message authentication code function with the second ciphertext as the key;
   comparing the first and third authentication tags; and
   comparing the second and fourth authentication tags, optionally wherein computing the third authentication tag comprises:
   i) performing Galois field multiplication on first authentication data to produce a first authentication stream;

ii) performing an exclusive OR operation on the first authentication stream and the first block of the first ciphertext;
iii) performing Galois field multiplication on the product of step ii;
iv) repeating steps ii and iii for every block of the first ciphertext;
v) performing Galois field multiplication on the product of step iv;
vi) performing an exclusive OR operation on the product of step v and a first length authentication vector, wherein the length authentication vector is a length of the first authentication data concatenated with a length of the first ciphertext;
vii) performing Galois field multiplication on the product of step vi; and
viii) performing an exclusive OR operation on the product of step vii and the first encryption data.

10. The computer-implemented method of claim 7, wherein for a first block of the first ciphertext, producing the second ciphertext further comprises:
encrypting a first initialisation vector with the first key, $k_1$, to produce first encryption data; and
performing the exclusive OR operation on the first encryption data and the first ciphertext.

11. The computer-implemented method of claim 8, wherein the mode of operation is Galois/counter mode, and wherein the method further comprises:
receiving a first authentication tag associated with the first ciphertext;
receiving a second authentication tag associated with the second ciphertext;
computing a third authentication tag using a Galois message authentication code function with the first ciphertext as the key;
computing a fourth authentication tag using a Galois message authentication code function with the second ciphertext as the key;
comparing the first and third authentication tags; and
comparing the second and fourth authentication tags, optionally wherein computing the third authentication tag comprises:
i) performing Galois field multiplication on first authentication data to produce a first authentication stream;
ii) performing an exclusive OR operation on the first authentication stream and the first block of the first ciphertext;
iii) performing Galois field multiplication on the product of step ii;
iv) repeating steps ii and iii for every block of the first ciphertext;
v) performing Galois field multiplication on the product of step iv;
vi) performing an exclusive OR operation on the product of step v and a first length authentication vector, wherein the length authentication vector is a length of the first authentication data concatenated with a length of the first ciphertext;
vii) performing Galois field multiplication on the product of step vi; and
viii) performing an exclusive OR operation on the product of step vii and the first encryption data.

12. The computer-implemented method of claim 9, wherein computing the fourth authentication tag comprises performing the method of steps i) to viii) on second authentication data, the second ciphertext, a second length authentication vector, and the second encryption data, wherein the second length authentication vector is a length of the second authentication data concatenated with a length of the second ciphertext.

13. The computer-implemented method of claim 10, wherein the mode of operation is cipher feedback mode, wherein the first ciphertext comprises x blocks, wherein the second ciphertext comprises x blocks, and wherein for the $x^{th}$ block of the first ciphertext, producing the second ciphertext further comprises:
i) encrypting the $(x-1)^{th}$ block of the second ciphertext with the first key, $k_1$;
wherein performing an exclusive OR operation on the first ciphertext and the first key comprises performing an exclusive OR operation on the product of step i and the $x^{th}$ block of the first ciphertext to produce an $x^{th}$ block of the second ciphertext.

14. The computer-implemented method of claim 10, wherein the mode of operation is output feedback mode, wherein the first ciphertext comprises x blocks; wherein the second ciphertext comprises x blocks, and wherein for the second block of the first ciphertext, producing the second ciphertext further comprises:
encrypting the first encryption data with the first key, $k_1$, to produce second block first encryption data;
wherein performing an exclusive OR operation on the first ciphertext and the first key comprises performing an exclusive OR operation on the second block first encryption data and the second block of the first ciphertext to produce a second block of the second ciphertext, optionally wherein for the $x^{th}$ block of the first ciphertext, producing the second ciphertext further comprises:
encrypting the $(x-1)^{th}$ block first encryption data to produce $x^{th}$ block first encryption data;
wherein performing an exclusive OR operation on the first ciphertext and the first key to produce a second ciphertext comprises performing an exclusive OR operation on the $x^{th}$ block first encryption data and the $x^{th}$ block of the first ciphertext to produce an $x^{th}$ block of the second ciphertext.

15. The computer-implemented method of claim 1, wherein the data encrypted with the plurality of keys, $k_1$-$k_n$, is plaintext data which has been encrypted with the plurality of keys.

16. A data processing apparatus comprising at least one computer processor configured to perform operations for carrying out the steps of method claim 1.

17. A non-transitory computer program comprising instructions which, when the program is executed by a computer, cause the computer to carry out the steps of method claim 1.

18. A non-transitory computer-readable storage medium comprising instructions which, when executed by a computer, cause the computer to carry out the steps of method claim 1.

19. The computer-implemented method of claim 1, wherein the predetermined time period is determined during the initial encryption of the data with the plurality of keys.

20. The computer-implemented method of claim 1, wherein the predetermined time period is determined between iterations.

21. The computer-implemented method of claim 1, wherein the plurality of keys consists of only two keys, $k_1$ and $k_2$.

* * * * *